T. B. MILLER.
ELECTRICAL CIRCUIT CHANGING SWITCH.
APPLICATION FILED SEPT. 11, 1912.
1,121,750.
Patented Dec. 22, 1914.
2 SHEETS—SHEET 1.
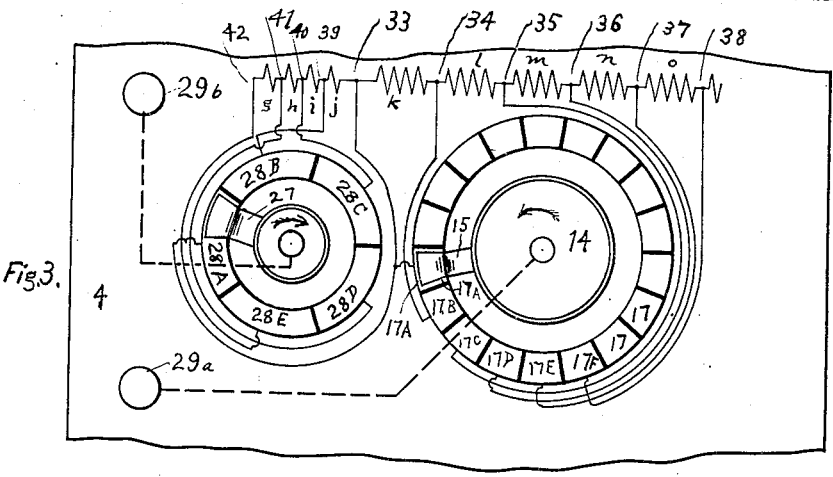
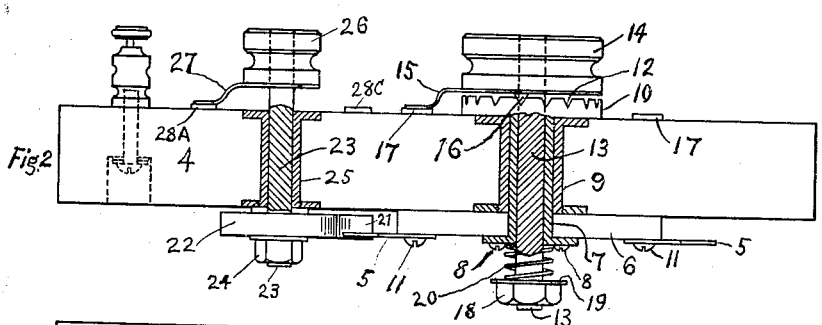
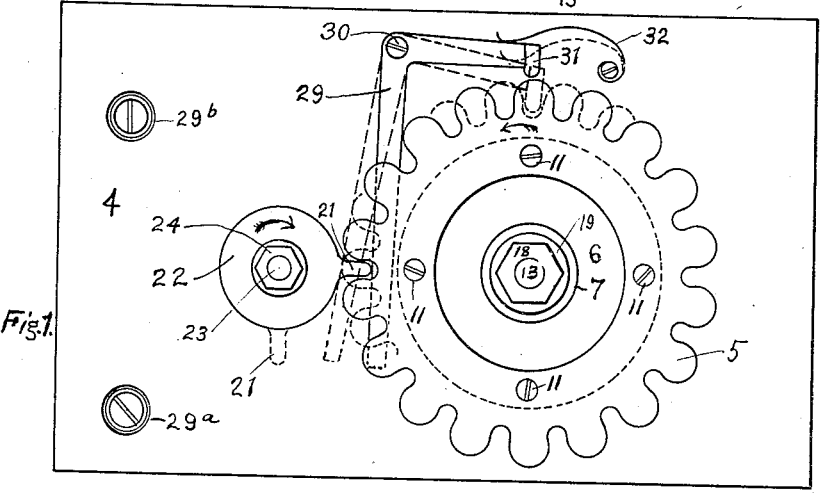
WITNESSES:
Roger Ward Shotwell
J. B. Hodgdon
INVENTOR.
Thomas Burton Miller
BY
C. D. Haskins
ATTORNEY.

T. B. MILLER.
ELECTRICAL CIRCUIT CHANGING SWITCH.
APPLICATION FILED SEPT. 11, 1912.

1,121,750.

Patented Dec. 22, 1914.
2 SHEETS—SHEET 2.

WITNESSES:
Roger Ward Shotwell
J. B. Hodgdon

INVENTOR
Thomas Burton Miller

BY
C. D. Haskins
ATTORNEY

UNITED STATES PATENT OFFICE.

THOMAS BURTON MILLER, OF SEATTLE, WASHINGTON, ASSIGNOR OF ONE-HALF TO SMITH CANNERY MACHINES COMPANY, OF SEATTLE, WASHINGTON, A CORPORATION OF WASHINGTON.

ELECTRICAL-CIRCUIT-CHANGING SWITCH.

1,121,750.   Specification of Letters Patent.   Patented Dec. 22, 1914.

Application filed September 11, 1912. Serial No. 719,873.

*To all whom it may concern:*

Be it known that I, THOMAS BURTON MILLER, citizen of the United States, residing at Seattle, in the county of King and State of Washington, have invented a certain new and useful Improvement in Electrical-Circuit-Changing Switches, of which the following is a specification.

My invention relates to improvements in electrical circuit changing switches which are adapted for use in connection with various electrical translating devices, like electric lamps, rheostats and various forms of electrical apparatus wherein electro-magnets and resistance coils are employed, but more particularly it relates to a peculiar mechanical structure adapted to actuate the movable contacts included in circuit changing switches and a plan of connecting parts of such switches with devices to be controlled by them; and the object of my improvement is to provide a simple, reliable and comparatively inexpensive device whereby there may be effected, with great rapidity, the minutest variation or the greatest variation, as desired, in the aggregate number of units of whatever may constitute the circuit or any portion thereof to which such device is applied. I attain this object by a device constructed in accordance with plans illustrated in the accompanying drawings wherein my invention is shown as applied to a tuning coil of a wireless telegraph system whereby one or any other number of the whole number of the convolutions of wire comprising said coil may quickly be withdrawn or included in the circuit in which said device is connected.

Figure 2A:
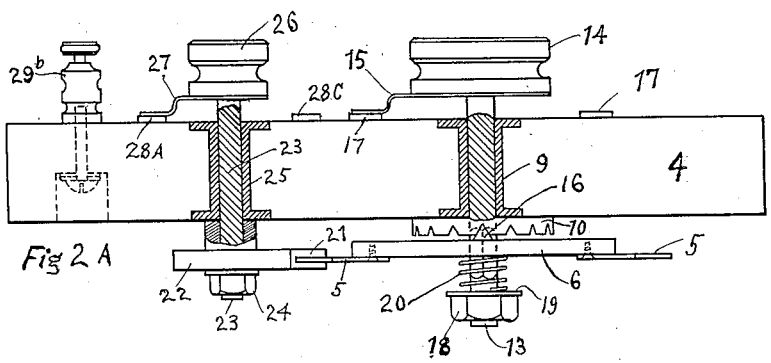
Figure 1A:
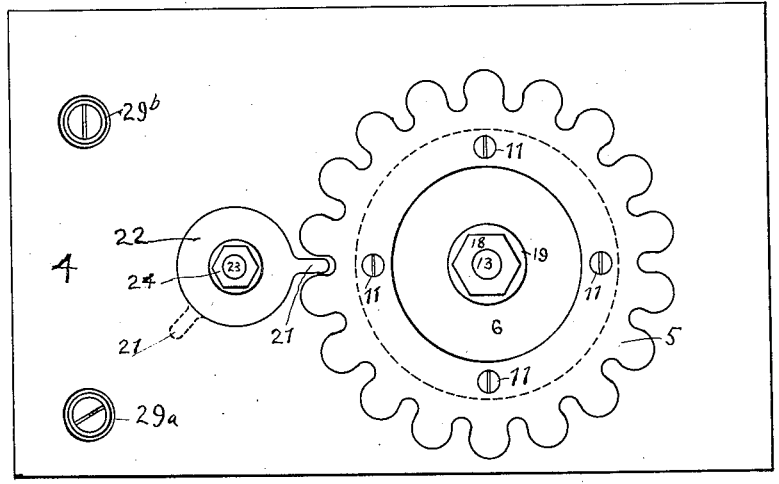

Referring to the drawings, Figure 1 is a diagrammatic illustration of parts of my invention in a plan view looking toward the under side thereof, Fig. 2 is a view in elevation of same with parts shown in longitudinal mid-section, Fig. 1A and Fig. 2A show a modification of mechanical parts which may be substituted for mechanical parts illustrated by Figs. 1 and 2; Fig. 3 is a diagram illustrating the plan of electrical connections whereby my invention may be employed in connection with the tuning coil of a wireless telegraph system.

Like reference numerals indicate like parts throughout the drawing.

Referring to Fig. 1, 4 is a base of suitable electrical insulating material as of vulcanized rubber, wood or slate, 5 is a toothed wheel of annular form and of suitable material which is fastened by a screw 11 to a disk 6 of insulating material and concentrically therewith. The disk 6 with the toothed wheel 5 attached thereto is fixed rigidly to a sleeve 7 by screws 8 which pass through a flange on the lower part of said sleeve 7 and into threaded holes in disk 6. The sleeve 7 extends upwardly and through a bushing 9 of suitable material and at its upper end is attached an annular flange 10 on the upper surface of which are radial V shaped notches 12. The bushing 9 thus forms a bearing within which the sleeve 7 may rotate while carrying the disk 6 and the notched flange 10. The bushing 9 is fixed rigidly within a hole through the insulating base 4.

Extending through the sleeve 7 is a rod or spindle 13 adapted to move freely therein. On the upper end of spindle 13 where it projects through the notched flange 10 there is rigidly attached a knob 14 to the under part of which is attached a switch arm 15 and one or more wedge shaped projections 16, (one of which only is shown in the drawings); the wedge shaped projections 16 are adapted to fit in and engage with the V shaped notches 12 of the notched flange 10. The switch arm 15 is of suitable springy electric conducting material and extends outwardly from the knob 14 to engage with the upper surfaces of the switch contact segments 17 which are disposed in a circle around, and concentric with, the knob 14, whereby said arm 15 may engage successively with each of the segments 17 when the knob 14 is rotated.

The lower end of the spindle 13 projects out of and downward from the sleeve 7 and thereon is provided with a screw-thread adapted to receive a threaded nut 18. Between the nut 18 and the flange of the sleeve 7 is disposed a washer 19 and a spiral spring 20 of suitable wire. The spring 20 is adapted to exert force between the washer 19 and sleeve 7 whereby there is always a tendency for the knob 14 to cause its wedge shaped projections 16 to engage with the V shaped notches 12 of the notched flange 10, whereby rotary motion imparted to the toothed wheel 5 will cause the notched flange 10 to carry with it the knob 14 and the switch arm 15. If, however, the knob 14 is rotated by being turned by hand while the toothed wheel 5 is locked in a fixed position then, by reason of the cam-like action of the V shaped notches 12 on the wedge shaped projections 16, the spring 20 is compressed by the raising of the spindle 13 and the switch arm 15 may then be placed in contact with any desired contact segment 17 within its path.

The teeth of the tooth wheel 5 are adapted to engage with a tooth-like projection 21 projecting from a disk 22 which is so disposed with relation to the toothed wheel 5 that for each revolution of disk 22 the projection 21 will cause the toothed wheel 5 to move the distance of one tooth in its circular path. The disk 22 is rigidly fixed to and is carried by the lower end of a spindle 23 to which it is clamped by the nut 24. The spindle 23 is adapted to rotate within the bushing 25 which is fixed in base 4. On the upper end of spindle 23, which projects through and above bushing 25, there is attached rigidly a knob 26, to the under side of which is fastened a switch arm 27 of springy metal which extends outwardly and in its circular movement engages successively with contact segments 28 which are disposed on the top of base 4 concentrically with the knob 26.

Beneath the base 4, as shown in Fig. 1, there is associated with the toothed wheel 5 an escapement or locking device comprising a lever 29 which is fulcrumed by the shank of a screw 30 and whose short arm is provided with a projection 31 which projects at a right angle to the plane of such short arm whereby it may enter the space between the teeth of the toothed wheel 5 while its long arm is disposed at such angle as will adapt it to engage with the projection 21 of disk 22 when said disk 22 is rotated. A spring 32 of suitable springy metal exerts a force which tends at all times to move the lever 29 whereby the projection 31 will enter a space between the teeth of the toothed wheel 5. Thus as shown in Fig. 1, when projection 21 of disk 22 engages the long arm of lever 29 to force said long arm 29 to the position indicated by full lines then the projection 31 on the short arm of the lever 29 is forced outwardly from the space between the teeth of the toothed wheel 5 whereby said toothed wheel 5 is free to be rotated by the continued movement of disk 22 until the projection 21 of disk 22 permits the lever 29 to move by force of the spring 32 to the position shown by the broken lines, when the projection 31 will be within the space between the teeth of the toothed wheel 5 as indicated by broken lines, thus the toothed wheel 5 will be locked in a fixed position at all times when lever 29 is not engaged with or acted upon by projection 21 of disk 22.

In Fig. 3 I have illustrated by diagram my invention as applied to a wireless telegraph system wherein at times it may become desirable to change quickly the number of convolutions of the wire of a tuning coil which are included in a circuit. In such diagram $17^A$—$17^B$—$17^C$— etc., indicate contact segments in the path of the switch arm 15, with which they are successively connected as said switch arm 15 is carried by knob 14 in its circular movement in the direction indicated by the screw, while the contact segments $28^A$—$28^B$—$28^D$— and $28^E$ are indicated as being disposed in the path of the switch arm 27 with which they successively engage as said switch arm 27 is carried in its circular movement by knob 26 in the direction shown by the arrow. The serrated line $g$—$h$—$i$—$j$—$k$—$l$—$m$—$n$— and $o$ represents the convolutions of wire of a tuning coil of a wireless telegraph system. In said serrated line $g$—$h$—$i$— and $j$ indicate, each, a single turn or convolution of wire while $k$—$l$—$m$—$n$— and $o$ indicate each a group of four convolutions of said tuning coil. The groups $k$—$l$—$m$—$n$— and $o$ of four convolutions each are connected as shown with contact segments $17^B$—$17^C$—$17^D$—$17^E$— and $17^F$ of the larger circle respectively while the single turns or convolutions $g$—$h$—$i$— and $j$ are connected respectively with contact segments $28^A$—$28^B$—$28^C$—$28^D$— and $28^E$ of the smaller circle. The switch may be connected with a wireless telegraph system by the terminals $29^b$ and $29^a$. The terminal $29^b$ as shown is in metallic connection with the switch arm 27 of the smaller circle while the terminal $29^a$ is in metallic connection with the switch arm 15 of the larger circle.

I will now describe the operation of my invention when applied as shown. Referring to Fig. 3, the terminals $29^b$ and $29^a$ may be connected to the receiving portion of a wireless station, not shown, when normally the circuit will extend from terminal $29^b$ by the path indicated by broken line to the metallic portions of the device thence to the switch arm 27 thence to contact segment 28 thence to contact segment $17^A$ of the larger circle, thence to switch arm 15, thence to terminal $29^a$ through metallic parts of the device and path shown by broken line. Thus all units comprising the tuning coil represented by the serrated line may be "short circuited" or "shunted". If the knob 26 be turned in the direction indicated by the arrow to put the switch arm 27 in to contact with segment 28$^B$ then the single unit $j$ will be included in the circuit between the terminals 29$^b$ and 29$^a$ since a path leads from segment 28$^B$ to point 39 thence through unit $j$ to point 33 thence to segment 17$^A$ of the larger circle thence to terminal 29$^a$, as shown, if it be desired to include two units in the circuit between terminals 29$^b$ and 29$^a$ then the switch arm 27 is put on segment 28$^c$ whereupon both units $i$ and $j$ will be brought into said circuit. Obviously the units $h$ and $g$ can be added to said circuit successively by moving the switch arm 27 to segments 28$^D$ and 28$^E$ successively.

When the switch arm 27 is in contact with segment 28$^E$ then the tooth 21 projecting from disk 22 is in such position with relation to the toothed wheel 5 that a further movement of the switch arm 27 (in the direction of the arrow to the position shown in Fig. 3 when it is in contact with segment 28$^A$) will cause tooth 21 of the disk 22 to engage with a tooth of the toothed wheel 5 whereby the switch arm 15 of the larger circle will be moved from segment 17$^A$ to segment 17$^B$. Thus the four convolutions $g$—$h$—$i$— and $j$ will be switched out of circuit while the four convolutions of group $k$ will be switched into circuit. Another turn of the switch arm 27 will successively switch the convolutions $j$—$i$—$h$— and $g$ into circuit and as switch arm 27 passes from segment 28$^E$ to segment 28$^A$ convolutions $j$—$h$— and $g$ will again be switched out of circuit and the switch arm 15 moving to segment 17$^C$ will add the four convolutions of the group L to the circuit and thus by continued turning of knob 26 all the convolutions of the tuning coil may be gradually added to the circuit. If, however, it be desired to quickly make a great change in the number of convolutions of the tuning coil included in the circuit it will only be necessary to turn the knob 14 directly to place the switch arm 15 into contact with any of the segments 17 to cut out any or all of the groups $k$—$l$—$m$—$n$— etc. of convolutions as desired. Obviously the switch arms 27 and 15 can be turned in either direction as may be quickest in reaching a particular result.

The mechanical features of my invention as illustrated by Figs. 1 and 2 may be modified by the plan of construction as illustrated by Fig. 1$^A$ and Fig. 2$^A$ where the parts indicated by the numbers 7—29—31 and 32 in Fig. 1 are not employed since the toothed wheel 5 may be locked by means shown in Fig. 2$^A$ illustrating the modified plan of construction wherein the notched disk 10 is rigidly fixed on the bottom of base 4 by being fastened to the lower end of bushing 9 while the insulating disk 6 is provided with a square hole in its center which permits it to be mounted on a squared portion of the spindle 13 which projects below the base 4 whereby the spindle 13 and the disk 6 may revolve together, but the disk 6 may move up or down vertically on spindle 13. On the upper side of disk 6 is fixed a wedge shaped projection 16 adapted to engage with and enter the radial notches on the disk 10 by the force exerted by the spring 20 which is disposed around the spindle 13 between the washer 19 and the disk 6. The spring 20 also tends to draw downward the knob 14 to press the switch arm 15 on to the segments 17. Thus when the knob 14 is turned to place the switch arm 15 on any desired segment the spindle 13 turns and carries with it the disk 6 with its toothed wheel 5 since said disk 6 is forced downward by the cam like action of the wedge shaped projection 16 which moves to another notch. The mechanism of the smaller circle, comprising the knob 26, spindle 23, switch arm 27, disk 22, projection 21 and nut 24, is the same in construction and operation as in the like mechanism shown in Figs. 1 and 2, and the electrical connections and mode of operating the switch is obviously the same in both structures.

Having described my invention and its mode of operation, what I claim is:

1. In an electrical circuit changing switch, two groups of contact segments, each group of which has a switch arm adapted to connect with each contact segment of its group, mechanism associated with the switch arm of one of said groups of contact segments whereby said switch arm may be moved independently from any one contact segment to any other contact segment of its same group, in combination with mechanism associated with both of said switch arms whereby the switch arm of one of said contact segments will be moved to an adjacent contact segment of the same group when the switch arm of the other group of contact segments is moved to complete a circle successively to engage with each of the contact segments of its said group.

2. In an electrical circuit changing switch, the combination with a supporting base, of a shaft mounted to revolve in bearings secured to said base, a switch arm attached to said shaft to revolve therewith, a handle fixed on said shaft whereby said shaft may be turned by one's hand, a disk that is provided with a projecting tooth and which is mounted on said shaft to revolve therewith, a second shaft mounted to revolve in other bearings secured to said base, a handle and another switch arm secured to said second shaft, a toothed wheel associated with said second shaft and adapted by suitable intervening mechanism releasably to be locked therewith, a detent lever pivotally secured to said base and adapted and disposed to be actuated by said projecting tooth of said disk to engage with the several teeth of said toothed wheel to lock said wheel as required, and a plurality of electrical contact segments disposed in the path of each of said switch arms to engage therewith.

In witness whereof, I hereunto subscribe my name this fifth day of September A. D., 1912.

THOMAS BURTON MILLER.

Witnesses:
W. MILLION,
ANNA HASKINS.